Figure 1:
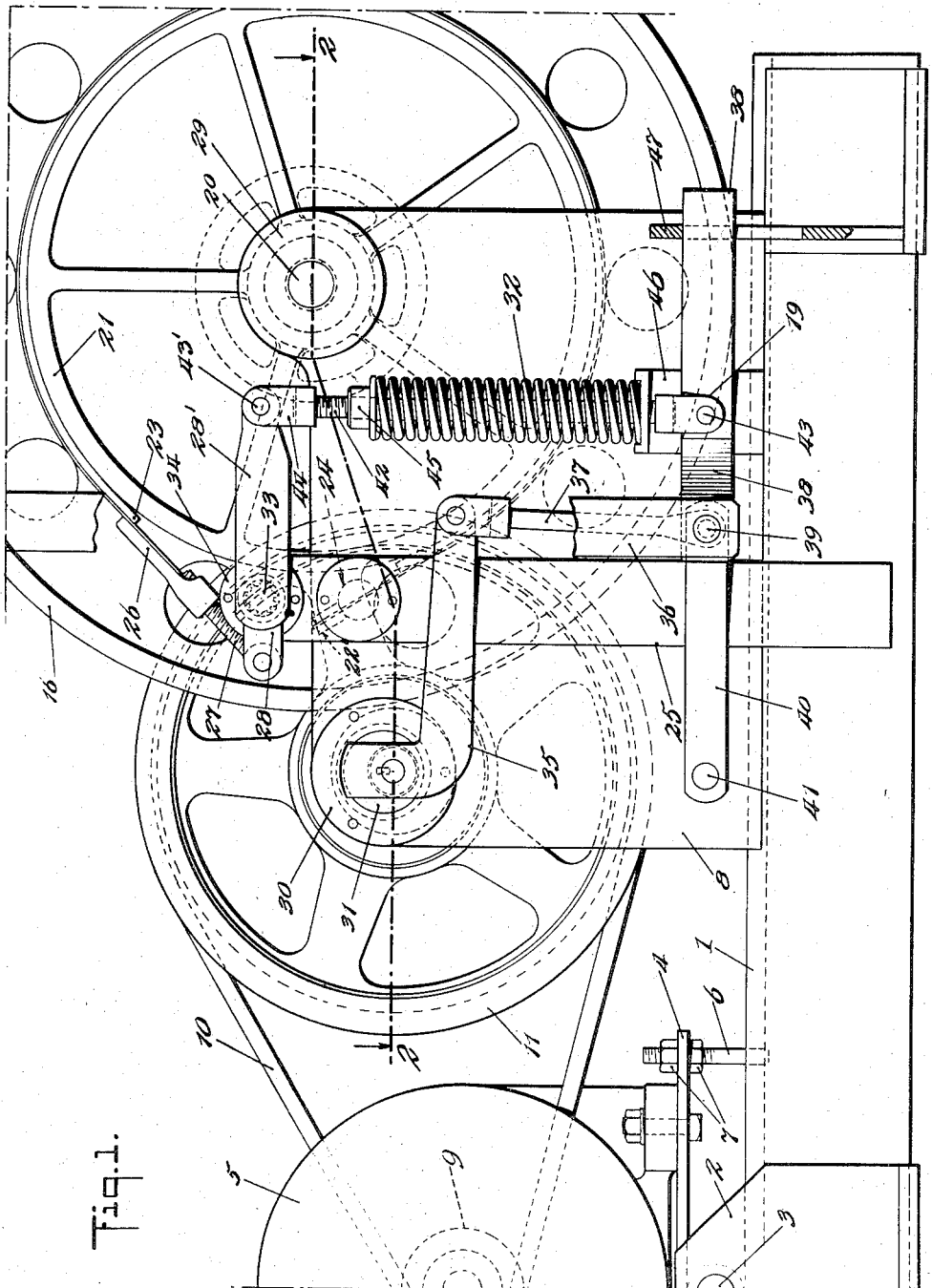

Nov. 13, 1951 G. E. MOORE 2,574,981
POWER-DRIVEN FRICTION WINCH
Filed Feb. 12, 1947 2 SHEETS—SHEET 1

INVENTOR
GEORGE E. MOORE
BY
ATTORNEYS.

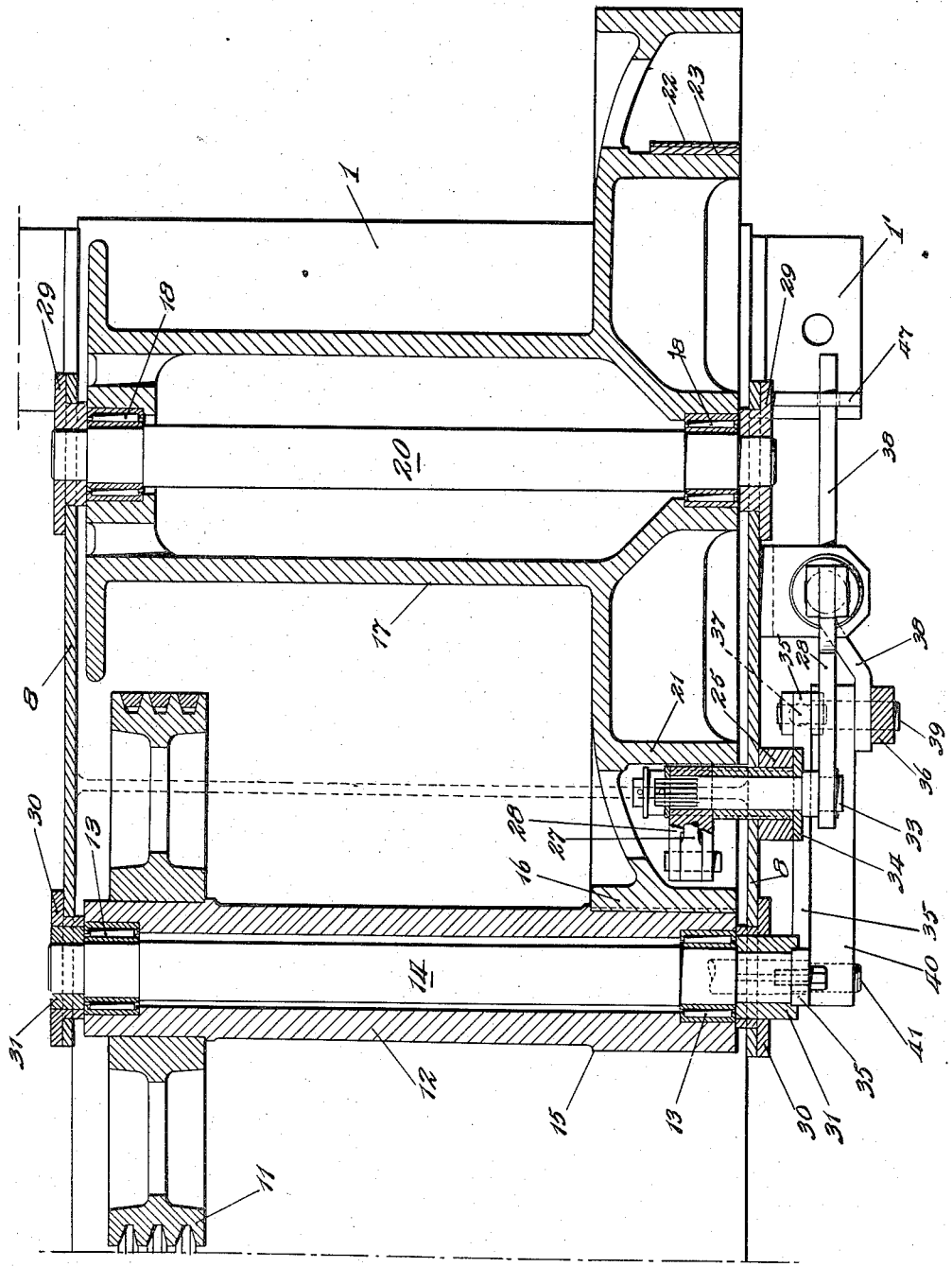

Patented Nov. 13, 1951

2,574,981

UNITED STATES PATENT OFFICE 2,574,981

POWER-DRIVEN FRICTION WINCH

George E. Moore, Muskegon Heights, Mich., assignor to Manning, Maxwell & Moore, Inc., Muskegon Heights, Mich., a corporation of New Jersey Application February 12, 1947, Serial No. 727,977

6 Claims. (Cl. 192—11)

1

This invention relates to improvements in load lifting and lowering power friction winches.

An object of this invention is to provide a drive for a load lifting and lowering winch with which a nonreversible, simple, easily controlled power source may be employed.

Another object of the invention is to provide a power driven drum type of winch having a drum bracket and friction brake whereby power raising and gravity lowering is effected.

Another object of this invention is to provide an interconnected control for the brake and friction drive whereby the power applied for lifting purposes may be readily graduated and the brake control for lowering purposes graduated with equal facility.

A more specific object of the invention is to provide a single manual control for this interconnection.

Other and more detailed objects of the invention will be apparent from the following description of the embodiment selected for illustration in the attached drawings.

This invention resides substantially in the combination, construction, arrangement and relative location of parts, all as will be described in detail below.

In the accompanying drawings:

Figure 1 is a side elevational view with some parts broken away of a winch constructed in accordance with this invention; and Figure 2 is a horizontal, central, cross-sectional view with some parts broken away on the line 2—2 of Figure 1.

The general combination as disclosed comprises a frame on which is rotatably supported a rope drum, a drive motor, a friction speed reducing power transmission between the motor and the drum, a brake for the drum, and a single manual interconnected control for the friction drive and brake for adapting the combination for hauling, lifting and lowering loads.

As illustrated, the mechanism includes a base plate or drum 1 of any suitable construction and material, as for example as illustrated, a rolled steel frame member provided with feet 1' attached thereto at the corners as by welding or the like, by means of which it may be bolted to a foundation if desired. The feet which are in the form of angles attached at the rear of the frame 1, project above the top plane thereof, as indicated at 2 (see Fig. 1, left end) on which is pivotally mounted, by means of a transverse shaft 3 extending therebetween, a motor plate 4 to which the drive motor 5 is secured. The shaft

2

3 is attached to the underside of plate 4, as for example by welding. A pair of stud bolts 6 provided with locking nut 7 are mounted on the motor plate 4 so as to adjust and maintain the pivotal position of the plate 4. By this simple arrangement the tension on the drive belt 10 may be easily controlled.

Welded to the sides of the base 1 are a pair of upright side plates 8 in which is journaled an intermediate shaft 14 in eccentrics 31, keyed or otherwise attached to the ends of the shaft 14. The eccentrics in turn are rotatable in flanged sleeves 30 secured to the upright plates 8. Rotatably mounted on the quill roller bearings 13 in turn mounted on the shaft 14, is a long cast iron sleeve 12 which is freely rotatable on these bearings. Secured to the shaft 12 is a large V-belt pulley 11 which is illustrated as multiple grooved. This pulley is connected by the belts 10 to a similarly multiple grooved V-belt pulley 9 attached to the shaft of the motor 5. The sleeve 12 has a cylindrical integral enlargement 15 faced smooth to act as a friction drive pulley which is engageable with a similarly faced large friction pulley 16 attached to or integral with the rope or cable drum 17.

The drum 17 is preferably a flanged cast iron cylinder for coiling the load rope, and as usual is provided with means (not shown) for anchoring one end of the load rope thereto. This drum rotates freely on a fixed shaft 20 on the intermediate quill roller bearings 18. The shaft 20 is mounted in a pair of flanged sleeves 29 attached to the side plates 8. The large friction pulley 16 has an inner turned annular ing 21 which serves as a brake drum. This brake drum is encircled by a brake band 22 consisting of a steel strip lined with a friction band 23. The end 22' (see Fig. 1) of the band 22 is anchored on a suitable stud 24 attached to the adjacent upright plate 8. The other end of the band 22 is provided with an internally threaded fitting 26 which threadedly engages with a threaded eye bolt 27, pivotally connected to the arm 28 which is splined to a connecting stud 33 carried in a flanged bushing 34 mounted the in the upper end of a rigid upright bar 25 secured to the base plate 1, as by welding. Secured to the other end of connecting studs 33, as by welding, is a lever 28' which is pivotally conected at 43' to a clevis 44. As will be seen in Figure 2, the lever 28 is inside of the adjacent upright plate 8 and the lever 28' is on the outside thereof.

The other end of the rod 42 is pivotally connected at 43 by means of a clevis 19 to a lever 38.

The rod 42 passes through a hole in and is slidably engaged at its lower end by means of an angle bracket 46 attached to the base plate 1. Rod 42 has a loose fit in the hole in bracket 46 to permit of the small amount of lateral movement resulting from the small arcuate movement of the upper end of rod 42. This bracket forms a seat for the lower end of a heavy coil spring 32 which surrounds the rod 42 and is engaged on its other end by a nut and washer 45 by means of which the initial loading of the spring 32 can be controlled. A horizontal guide rod 40 is pivotally mounted at 41 on the side plate 8 and at its other end is pivotally connected at 39 to the integral extension 38 of a vertically extending hand operated lever 36. The pivot pin 39 is also pivotally connected to a link 37 which in turn is pivotally connected to a bell crank lever 35 attached to the eccentric 31 to effect rotation thereof. The other end of the transverse extension 38 of the lever 36 lies in a closed ended slot in a guide plate 47 welded to the base plate 1. The pivotal connection 43 for the clevis 19 is mounted on this extension 38, as shown.

Before describing the operation of this device a few features of construction will first be noted. The lever 28 is splined to the inner end of the connecting stud 33 so that the angle at which this lever is located in relation to the direction of the pull of the brake strap can be varied to secure a gradual brake release when lowering a load. The pressure exerted on the lever 28' by the spring 32 is adjustable by means of the nut 45 so as to keep the brake normally "on" with sufficient force to hold the load applied to the rope wound on the drum 17. The lower closed end of the slot in the guide plate 47 is sufficiently removed from the end of the extension 38 so as not to be engaged thereby in the operation of the device while the upper closed end of this slot forms a fulcrum for the lever 38, as will be explained. The horizontal guide rod 40 is provided to serve merely as a guide to keep the levers connected thereto in place. The pivot stud 39 at the junction of the vertical hand lever 36 and its extension lever 38 provides in effect the fulcrum of the vertical hand lever 36 reacting through the connecting rod 37 on the horizontal bell crank lever 35 attached to the eccentric 31.

When the vertical hand lever 36 is moved forward towards the drum end of the hoist (clockwise in Fig. 1), the horizontal extension lever 38 with the connecting rod 42 is pulled downwardly compressing the spring 32 and tending to release the brake, while at the same time the other end with the first connecting rod 37 moves up tending to turn the eccentric 31 on the intermediate shaft 14 in a counterclockwise direction. This causes the intermediate shaft 14 with the sleeve 12, concentrically journalled therein in the bearings 13, to move so that its friction drive enlargement 15 forcefully engages with the driven friction wheel 16, completing a drive connection from the motor to the rope drum. The magnitude of the contacting force required has been predetermined by the several lever ratios and is dependent on the adjusted force of the spring, the brake force and the friction drive pressure being interdependent so that a driving force is exerted through the friction drive simultaneously with and proportional to the release in brake force. The result is that an intermediate interval will occur when the braking force is partially released and the frictional driving force partially applied, the brake tending to let the load drop and the friction drive tending to prevent it in equal measure. During this interval both of these elements slip, and as a result the operator by manipulating the lever 36 has a graduated control of the device. Upon consideration it will be seen that the amount of pressure that can be applied to the friction driving members is not directly dependent on the operator, but rather on the setting of the spring 32 which is adjustable according to requirements. As soon as the vertical hand lever 36 is released the spring 32 will release the friction drive and simultaneously seat the brake, thereby holding the drum and the load attached to the drum cable.

When the vertical hand lever 36 is moved backward towards the motor end of the hoist (in a counterclockwise direction, Fig. 1), the right hand terminal end of lever 38 will contact the upper closed end of the guide slot in the guide plate 47, providing at this point a fulcrum for the lever 38, with the result that the second connecting rod 42 will be forced downwardly against the resistance of spring 32, releasing the brake. Simultaneously the first connecting rod 37 will move the horizontal bell crank lever 35 in a counterclockwise direction, rotating the eccentrics 31 in the same direction to cause complete disengagement of the driving enlargement 15 from the driven friction wheel 16. By manipulation of the lever 36 the resistance to rotation of the rope drum 17 under the pull of the load on the end of the rope can be controlled so that the load is lowered by gravity at the desired rate of speed. The friction drive will be completely disengaged at this time and the parts are so proportioned that within the limits of the lowering control effected by the lever 36 they will not engage. Thus the load can be lowered under the control of the operator through the agency of the same lever as is used for hoisting, assuming, of course, that the load on the rope is sufficiently heavy to turn the cable drum. The drum can be completely freed when the brake is fully released so that light loads can be lowered, or if the rope is unloaded it can be pulled out by hand with great ease and as fast as desired. During lowering the brake is completely released, the only part that rotates is the cable drum and its integral parts. By reason of the relatively large brake drum and long operating lever 36, the operator can control the load to a very fine degree of accuracy.

It will be noted for emphasis that only one operating lever is required to effect the full range of operation of the device. Another feature which contributes to the simplicity of the mechanism is that a non-reversing motor, or a small gasoline engine, which are relatively cheap power units, may be employed. No special controllers are required and no gears are used.

In passing it is interesting to note that the friction members 15 and 16 are preferably made of cast iron because of its superior wearing qualities coupled with adequate frictional properties.

Those skilled in the art will readily appreciate the subject matter of this invention is capable of embodiment in other physical forms, and I do not, therefore, desire to be strictly limited to the illustrated disclosure hereof, but rather by the claims granted me.

What is claimed is:

1. In a winch of the type described, the combination including a rotatably supported rope drum, a drive motor, power transmission means interconnecting the motor with said drum including a pair of cooperating friction members, one of said members being mounted on eccentrics for radial movement with respect to the other, a brake for said rope drum, spring loaded means for applying said brake under predetermined pressure, means including a lever for overcoming the effect of said spring and effecting rotation of said eccentrics in a drive applying direction upon movement of said lever in one direction, said lever having an integral lateral extension and said last mentioned means including a linkage for rotating said eccentrics pivotally connected at one end to the point of juncture of the lever and its extension, and a linkage interconnecting the brake with said extension for overcoming the force of said spring.

2. In a winch of the type described, the combination including a rotatably supported rope drum, a drive motor, power transmission means interconnecting the motor with said drum including a pair of cooperating friction members, one of said members being mounted on eccentrics for radial movement with respect to the other, a brake for said rope drum, spring loaded means for applying said brake under predetermined pressure, means including a lever for overcoming the effect of said spring and effecting rotation of said eccentrics in a drive applying direction upon movement of said lever in one direction, said lever having an integral lateral extension and said last mentioned means including a linkage for rotating said eccentrics pivotally connected at one end to the point of juncture of the lever and its extension, a linkage interconnecting the brake with said extension for overcoming the force of said spring, and means providing a fulcrum for said extension beyond the point of connection with said second linkage for one direction of movement of said lever.

3. In a winch of the type described, the combination including a rotatably supported rope drum, a drive motor, power transmission means interconnecting the motor with said drum including a pair of cooperating friction members, one of said members being mounted on eccentrics for radial movement with respect to the other, a brake for said rope drum, spring loaded means for applying said brake under predetermined pressure, means including a lever for overcoming the effect of said spring and effecting rotation of said eccentrics in a drive applying direction upon movement of said lever in one direction, said brake including a brake drum connected to said cable drum, a brake band encircling said brake drum, means for anchoring one end of said brake band, a pivotally supported lever connected to the other end of said brake band, means including a connecting rod for operating said lever, a spring acting on said connecting rod to apply said brake band, a manual lever having an integral extension, means for pivotally attaching said connecting rod to said extension intermediate its ends, means forming a fulcrum for the free end of said extension, and means interconnecting said manual lever at the point of juncture with the extension to said drive.

4. A winch of the type described comprising a rope drum, a drive motor, a power transmission interconnecting the motor with the drum including a friction drive, a brake for said drum, said brake including a brake drum connected to said cable drum, a brake band encircling said brake drum, means for anchoring one end of said brake band, a pivotally supported lever connected to the other end of said brake band, means including a connecting rod for operating said lever, a spring acting on said connecting rod to apply said brake band, a manual comprising a lever having an integral extension, means for pivotally attaching said connecting rod to said extension intermediate its ends, means forming a fulcrum for the free end of said extension, means interconnecting said manual lever at the point of juncture with its extension to said friction drive, and means for varying the angular position of the lever to which the end of the brake band is connected with respect to the adjacent end of the brake band.

5. A winch of the type described comprising a rotatable rope drum, a power driven friction clutch for rotating said drum, a brake for said drum, a spring loaded member normally applying said brake, a linkage system for operating said clutch, and a control manual pivotally connected to said linkage system and to said member, whereby movement of said manual in one direction first pivots said lever on said member until said clutch is engaged and then moves said member against the resistance of its spring loading to release said brake, said manual being a bell crank lever and the pivotal connection to said linkage system being at the apex of the angle formed by the bell crank lever.

6. A winch of the type described comprising a rotatable rope drum, a power driven friction clutch for rotating said drum, a brake for said drum, a spring loaded member normally applying said brake, a linkage system for operating said clutch, and a control manual pivotally connected to said linkage system and to said member, whereby movement of said manual in one direction first pivots said lever on said member until said clutch is engaged and then moves said member against the resistance of its spring loading to release said brake, said manual being a bell crank lever and the pivotal connection to said linkage system being at the apex of the angle formed by the bell crank lever and the pivotal connection to said member being intermediate to the ends of one of the arms of the bell crank manual, and a fixed fulcrum normally engaging the same arm of the bell crank near the free end thereof.

GEORGE E. MOORE.

REFERENCES CITED

The following references are of record in the file of this patent:

UNITED STATES PATENTS

| Number | Name | Date |
|---|---|---|
| 127,726 | Williamson | June 11, 1872 |
| 833,994 | Bradshaw | Oct. 23, 1906 |
| 1,450,019 | Cunning | Mar. 27, 1923 |
| 1,956,766 | Jordan | May 1, 1934 |